US008751024B2

(12) United States Patent
Lee et al.

(10) Patent No.: US 8,751,024 B2
(45) Date of Patent: Jun. 10, 2014

(54) METHOD AND APPARATUS FOR GENERATION AND PLAYBACK OF OBJECT BASED AUDIO CONTENTS

(75) Inventors: Yong Ju Lee, Daejeon (KR); Tae Jin Lee, Daejeon (KR); Jeong Il Seo, Daejeon (KR); In Seon Jang, Daejeon (KR); Dae Young Jang, Daejeon (KR); Seung Kwon Beack, Seoul (KR); Jae Hyoun Yoo, Daejeon (KR); Min Je Kim, Daejeon (KR); Kyeong Ok Kang, Daejeon (KR); Jin Woong Kim, Daejeon (KR); Jin Woo Hong, Daejeon (KR); Seung Chul Ham, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 609 days.

(21) Appl. No.: 12/634,915

(22) Filed: Dec. 10, 2009

(65) Prior Publication Data

US 2010/0161087 A1 Jun. 24, 2010

(30) Foreign Application Priority Data

Dec. 22, 2008 (KR) ........................ 10-2008-0130896

(51) Int. Cl.
*G06F 17/00* (2006.01)

(52) U.S. Cl.
USPC ............................................................ 700/94

(58) Field of Classification Search
USPC ..................... 700/94; 381/61, 77, 85, 98–109
See application file for complete search history.

(56) References Cited

U.S. PATENT DOCUMENTS

| | | | | |
|---|---|---|---|---|
| 6,704,421 | B1 * | 3/2004 | Kitamura | 381/103 |
| 7,027,600 | B1 | 4/2006 | Kaji et al. | |
| 2003/0212466 | A1 * | 11/2003 | Alferness | 700/94 |
| 2010/0174548 | A1 * | 7/2010 | Beack et al. | 704/503 |

FOREIGN PATENT DOCUMENTS

| | | | |
|---|---|---|---|
| KR | 1020050014859 | A | 2/2005 |
| KR | 1020050027219 | A | 3/2005 |
| KR | 1020070061100 | A | 6/2007 |
| KR | 1020080063155 | A | 7/2008 |
| KR | 1020080082917 | A | 9/2008 |
| KR | 1020080095928 | A | 10/2008 |
| WO | 2008/100119 | A1 | 8/2008 |

OTHER PUBLICATIONS

International Standard; Information Technology-Coding of audio-visual objects; Mar. 2002; N4848; XP001074670 6 attachments due to size of paper 472 pages total.

(Continued)

*Primary Examiner* — Andrew C Flanders
(74) *Attorney, Agent, or Firm* — Ladas & Parry LLP

(57) ABSTRACT

Disclosed are an apparatus and a method of providing contents. The apparatus of providing the contents may include a receiving unit to receive, from a contents provider, contents and information about a contents providing location, a local group setting unit to search for at least one cell based on the information about the contents providing location and to set the retrieved cell as a content providing location group of the contents, and a transmitting unit to transmit the contents to the set content providing location group. The object based audio contents may be consecutively replayed based on an identical audio preset.

8 Claims, 4 Drawing Sheets

(56) References Cited

OTHER PUBLICATIONS

Rikk Carey, et al; ISO/IEC 14772-1:1997 Virtual Reality Modeling Language (VRML(97) VRML Consortium Incorporated; Copyright 1997; URL: http://www.vrml.org/Specifications/VRML97 244 pages.

Taejin Lee, et al; "A Personalized Preset-based Audio System for Interactive Service", Audio Engineering Society Convention Paper 6904 Presented at the 121st Convention Oct. 5-8, 2006; San Francisco CA; 6 pages.

* cited by examiner

METHOD AND APPARATUS FOR GENERATION AND PLAYBACK OF OBJECT BASED AUDIO CONTENTS

CROSS-REFERENCE TO RELATED APPLICATION

This application claims the benefit of Korean Patent Application No. 10-2008-0130896, filed on Dec. 22, 2008, in the Korean Intellectual Property Office, the disclosure of which is incorporated herein by reference.

BACKGROUND

1. Field of the Invention

The present invention relates to an object based audio contents generation/playback method and an apparatus thereof, and more particularly, to the object based audio contents generation/playback method and an apparatus thereof that may set a common preset ID of an audio preset in an object based audio service.

2. Description of the Related Art

A conventional audio signal provided through a broadcasting service, such as a broadcasting, a radio broadcasting, a Digital Multimedia Broadcasting (DMB), and the like is a signal stored/transmitted after synthesizing audio signals obtained from various sound sources and mixing the synthesized audio signals into a single audio signal.

An audience may be able to adjust a strength of entire audio signals and the like in the described environment. However, the audience may not control a feature of an audio signal of each sound source, such as adjusting of a strength of an audio signal of each sound source included in an audio signal.

However, if the audio signal of each sound source is independently stored without being synthesized when audio contents are made, a contents playback terminal may control the strength of the audio signal of each sound source and the like and enables the audience to view corresponding contents.

An audio service that may independently store/transmit a plurality of audio signals through a storing/transmitting end, and that may enable the audience to appropriately control each audio signal through a receiving unit (contents playback device) while listening to the corresponding contents is referred to as an object based audio service.

The object based audio service may define attributes, such as a location of each object, a strength of a sound, a sound characteristic based on the location of the object, and the like, as a preset, and may provide the defined preset, thereby enabling the user to utilize the preset for playback of the audio contents. That is, when the object based audio service generates a plurality of preset audio information and services a file including the generated plurality of preset audio information, a receiving end may more efficiently perform playback of the object based audio service.

As an example, in a case of an audio signal constituted by a vocal sound and sounds of four musical instruments, a producer of the object audio contents may set a preset 1 where a volume of each sound source is set to be identical, may set a preset 2 where only the vocal sound source is replayed, and may set a preset 3 where only the sound of the four musical instruments are replayed. In this instance, the user may select one preset of the preset 1, the preset 2, and the preset 3, thereby enabling the user to easily listen to the music in various atmospheres.

In general, however, a number of presets and conditions set in the preset may be set to be different for each contents depending on the producer of the object based audio contents.

Accordingly, when the user wants to consecutively listen to the object based audio contents supporting the preset, there is a burden that the user needs to set a desired preset for each contents.

SUMMARY

An aspect of the present invention provides an object based audio contents generation apparatus and an object based audio contents playback apparatus that may consecutively replay a plurality of object based audio contents based on an identical audio preset.

According to an aspect of the present invention, there is provided an apparatus of generating object based audio contents including a database to store at least one first audio preset and a first preset ID of the at least one first audio preset, a preset generating unit to generate an audio preset including information about an object attribute of each of a plurality audio objects constituting the audio contents, a preset ID setting unit to set a preset ID of the generated audio preset, and an encoding unit to encode the plurality of audio objects, the audio preset, and the preset ID to generate the object based audio contents. Here, when a first audio preset corresponding to the generated audio preset exists in the database, the preset ID setting unit sets a first preset ID of the corresponding first audio preset as a preset ID of the generated audio preset.

In this instance, when the first audio preset corresponding to the generated audio preset does not exist in the database, the preset ID setting unit generates a second preset ID different from the at least one first preset ID and sets the second preset ID as the preset ID of the generated audio preset.

According to an aspect of the present invention, there is provided an apparatus for playback of object based audio contents including a decoding unit to decode, from the object based audio contents, a plurality of audio objects, a plurality of third preset IDs, and a plurality of audio presets indicated by the plurality of third preset IDs, the audio preset including information about an object attribute of each of the plurality of audio objects, an interface unit to provide at least one fourth preset ID to a user, and to receive a single fourth preset ID among the at least one fourth preset ID from the user, the at least one fourth preset ID being predetermined, a preset selecting unit to select an audio preset indicated by a third preset ID corresponding to the received single fourth preset ID from among the decoded plurality of audio presets, when the third preset ID corresponding to the received single fourth preset ID exists among the decoded plurality of third preset IDs, and a playback unit to perform playback of the object based audio contents by rendering the plurality of audio objects based on the information about the object attribute of each of the plurality of audio objects included in the selected audio preset.

According to an aspect of the present invention, there is provided a method of generating object based audio contents including storing at least one first audio preset and a first preset ID of the at least one first audio preset in a database, generating an audio preset including information about an object attribute of each of a plurality of audio objects constituting the audio contents, setting a preset ID of the generated audio preset, and generating the object based audio contents by encoding the plurality of audio objects, the audio preset, and the preset ID. Here, when a reference audio preset corresponding to the generated audio preset exists in the database, a reference preset ID of the corresponding reference audio preset is set as a preset ID of the generated audio preset.

According to an aspect of the present invention, there is provided a method for playback of object based audio contents including decoding, from the object based audio contents, a plurality of audio objects, a plurality of third preset IDs, and a plurality of audio presets indicated by the plurality of third preset IDs, the audio preset including information about an object attribute of each of the plurality of audio objects, providing at least one fourth preset ID to a user and receiving a single fourth preset ID among the at least one fourth preset ID from the user, the at least one fourth preset ID being predetermined, selecting an audio preset indicated by a third preset ID corresponding to the received single fourth preset ID from among the decoded plurality of audio presets, when the third preset ID corresponding to the received single fourth preset ID exists among the decoded plurality of third preset IDs, and performing playback of the object based audio contents by rendering the plurality of audio objects based on the information about the object attribute of each of the plurality of audio objects included in the selected audio preset.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
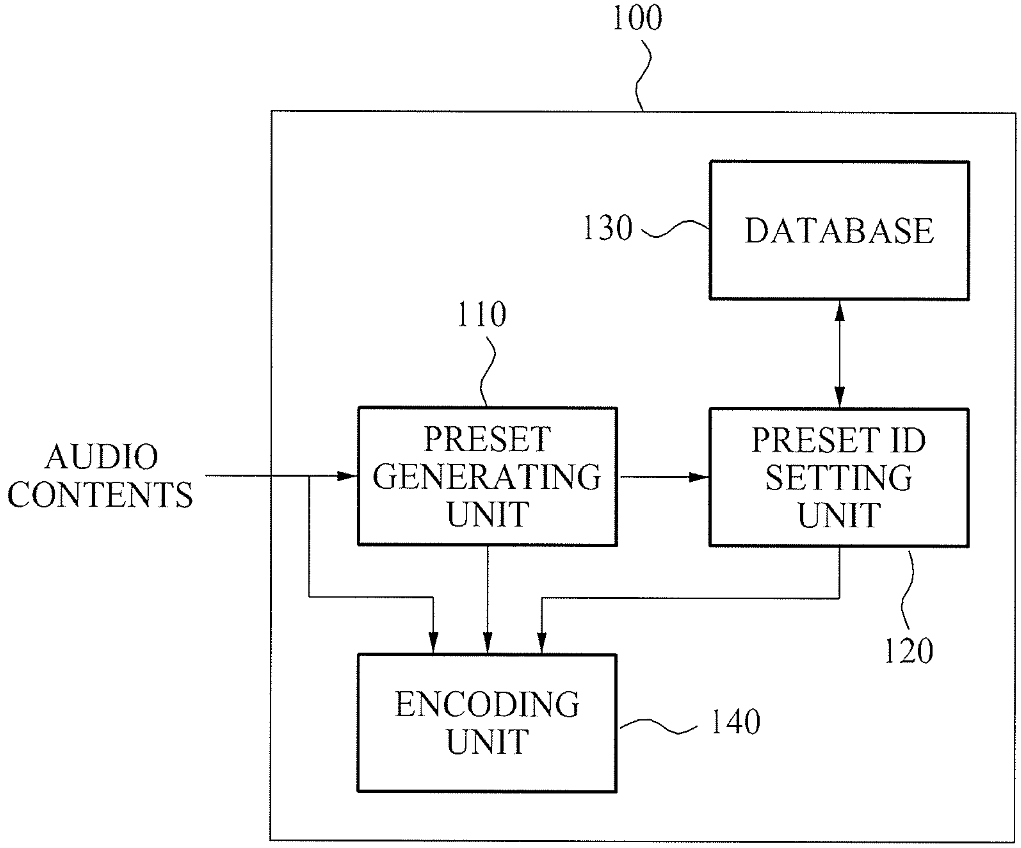
FIG. 1 is a block diagram illustrating a detailed configuration of an object based audio contents generation apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a detailed configuration of an object based audio contents generation apparatus according to an embodiment of the present invention.

The object based audio contents generation apparatus 100 according to an embodiment of the present invention may include a preset generating unit 110, a preset ID setting unit 120, a database 130, and an encoding unit 140. Hereinafter, a function of each element will be described in detail.

The preset generating unit 110 may generate an audio preset including information about an object attribute of each of a plurality of audio objects constituting audio contents.

According to an embodiment of the present invention, the object attribute may include at least one of a volume of an audio object, a location, and a sound characteristic at the location.

That is, the object based audio service may define an audio scene by using a preset, the audio scene defining characteristics such as a location of each audio object, a volume, and the like. A preset configuration may include the audio scene information set by the preset.

As an example, in the case of musical contents constituted by five audio objects including a vocal audio object, a piano audio object, a drum audio object, a guitar audio object, a keyboard audio object, and the like, an audio preset 1 has a preset configuration including all the five audio objects, an audio preset 2 has a preset configuration including four audio objects excluding the vocal audio object, and an audio preset 3 has a preset configuration including only the vocal audio object.

In this instance, although only three audio presets are described, it is apparent to one skilled in the art that various combinations are possible. Further, in a case of the preset configuration including all the five audio objects, it is also obvious that various types of audio presets may be generated by adjusting the location of each audio object and the strength of the sound of the preset configuration including all the five audio objects.

A plurality of audio presets may be generated by mixing the audio objects according to each preset configuration, and the generated plurality of audio presets are stored and provided to a user terminal. Then, the user terminal may select one audio preset from among the plurality of audio presets (three audio presets in the described examples). Accordingly, a user may easily change and listen to various combinations of audio in a portable terminal environment having a relatively simple interface.

The preset ID setting unit 120 may set a preset ID of each of the plurality of generated audio presets.

Accordingly, the user of the object based audio contents may easily determine information about the plurality of generated audio presets. As an example, the preset ID setting unit 120 may set a string related to a meaning of the generated audio preset as the preset ID of the generated audio preset.

The database 130 may store at least one first audio preset and a preset ID of the at least one first audio preset.

In this instance, the database 130 may set the first preset ID of the at least one first audio preset in advance, may match the set first preset ID to the at least one first audio preset, and may store the matched first preset ID.

As an example, a first preset ID of the audio preset 1 is set to "normal", a first preset ID of the audio preset 2 is set to "solo", and a first preset ID of the audio preset 3 is set to "karaoke".

According to an embodiment of the present invention, the database 130 may select and store the at least one first audio preset and the first preset ID based on a preference of the user of the object based audio contents.

That is, when generating an audio preset, a producer of the object based audio contents may collect information about the preference of the user in advance, and may set an audio preset that the user prefers by using the information about the preference of the user.

As an example, the first audio preset may include the above described audio preset 1, the audio preset 2, the audio preset 3, and the like.

In this instance, the preset ID setting unit 120 may determine whether a first audio preset corresponding to the audio preset generated in the preset generating unit 110 exists in the database 130.

When the first audio preset corresponding to the generated audio preset exists in the database 130, the preset ID setting unit 120 may set a first preset ID of the corresponding first audio preset as a preset ID of the generated audio preset.

When the first audio preset stored in the database 130 is determined based on the preference of the user, the first audio preset may be an audio preset that is commonly used by users. Accordingly, when a preset ID of the commonly used audio preset is set in advance and stored in the database 130, and a preset ID is set based on the set audio preset stored in the database 130, an identical preset ID may be set with respect to the commonly used audio preset.

As an example, as described above, with respect to the audio preset 3 including the four audio objects excluding the vocal audio object, an object based contents producer may set a preset ID of the audio preset 3 as "solo", whereas another object based contents producer may set the preset ID of the audio preset 3 as "a cappella". In this instance, a name of the preset with respect to the identical audio preset may be set to be different.

Accordingly, to set an identical preset ID with respect to the identical audio preset, the preset ID setting unit 120 of the present invention may only set a first preset ID with respect to an audio preset having an identical feature with the first audio preset stored in the database 130, thereby enabling the identical preset ID for the identical audio preset to be set.

Also, when the first audio preset corresponding to the generated audio preset does not exist in the database 130, the preset ID setting unit 120 may generate a second preset ID different from the at least one first preset ID stored in the database 130, and may set the second preset ID as the preset ID of the generated audio preset.

That is, when a preset corresponding to the audio preset generated in the preset generating unit 110 does not exist in the database 130, the preset ID setting unit 120 may generate a new preset ID. In this instance, the generated preset ID is different from the first preset ID stored in the database 130. Accordingly, the first preset ID is set only with respect to the first audio preset.

The encoding unit 140 may encode a plurality of audio objects, an audio preset, and an preset ID, and may generate an object based audio contents.

Figure 2:
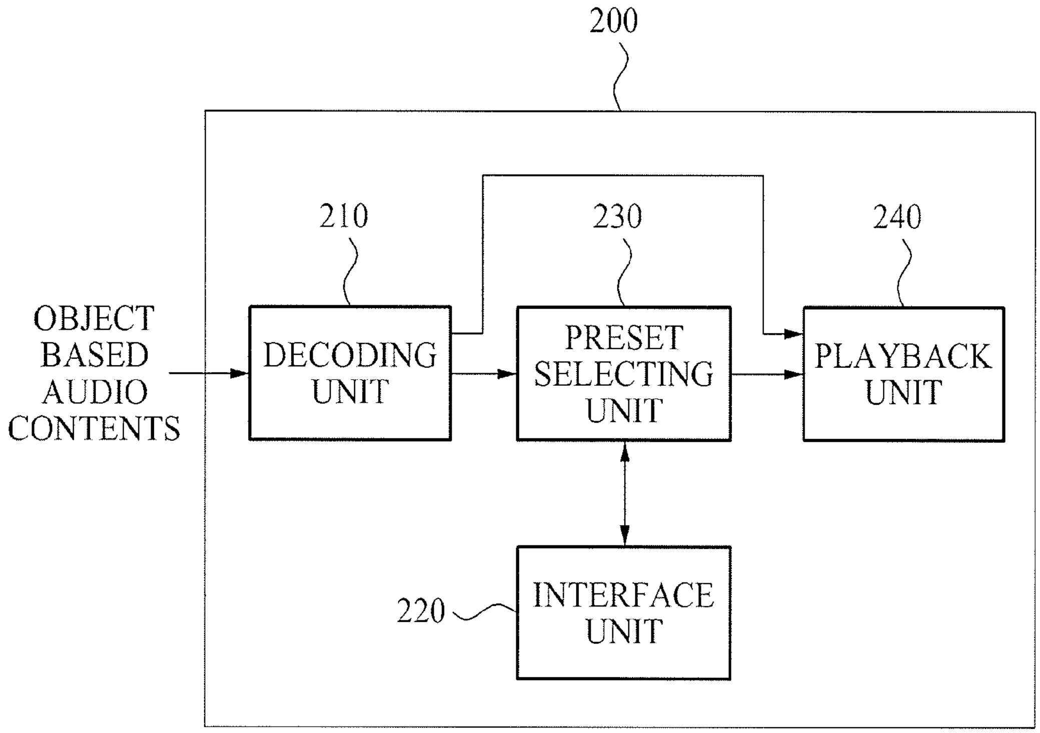
FIG. 2 is a block diagram illustrating a detailed configuration of an object based audio contents playback apparatus according to an embodiment of the present invention.

FIG. 2 is a block diagram illustrating a detailed configuration of an object based audio contents playback apparatus according to an embodiment of the present invention.

The object based audio contents playback apparatus 200 may include a decoding unit 210, an interface unit 220, a preset selecting unit 230, and a playback unit 240. Hereinafter, a function of each element will be described in detail.

The decoding unit 210 may decode, from the object based audio contents, a plurality of audio objects, a plurality of third preset IDs, and a plurality of audio presets indicated by the plurality of third preset IDs.

That is, the plurality of third preset IDs may be matched to the plurality of audio presets. Also, each of the plurality of audio presets may include information about an object attribute of each of the plurality of audio objects.

According to an embodiment of the present invention, the object attribute may include at least one of a volume of an audio object, a location, and a sound characteristic at the location.

The interface unit 220 may provide at least one fourth preset ID to a user and may receive a single fourth preset ID from the at least one fourth preset ID from the user, the at least one fourth preset ID being predetermined.

That is, the interface unit 220 may provide the at least one fourth preset ID to the user, and may select one fourth preset ID of the provided at least one fourth preset ID.

The fourth preset ID may include a preset ID of an audio preset that is commonly used. In this instance, the fourth preset ID may include a first preset ID included in the database 130 of the object based audio generation apparatus 100 described in FIG. 1.

According to an embodiment of the present invention, each of the third preset IDs and each of the fourth preset IDs may include at least one of a string and a number.

When a third preset ID corresponding to a received single fourth preset ID exists among the decoded plurality of third preset IDs, the preset selecting unit 230 may select an audio preset indicated by the corresponding third preset ID among the decoded plurality of audio presets, and the playback unit 240 may render the plurality of audio objects based on the information with respect to the object attribute of each of the plurality of audio objects included in the selected audio preset and may perform playback of the object based audio contents.

That is, the preset selecting unit 230 may search for a preset ID identical to a fourth preset ID inputted through the interface unit 220 among the decoded preset IDs, and, when the identical preset ID exists, the preset selecting unit 230 may select an audio preset corresponding to the identical preset ID.

When an object based audio contents replayed in the object based audio contents playback apparatus 200 is generated in the object based audio contents generation apparatus 100, the identical preset ID is set for an identical audio preset. Accordingly, when a user selects a single fourth preset ID through the interface unit 220, although a plurality of object base audio contents being different from each other are consecutively replayed, the replayed plurality of object based audio contents may be replayed based on the audio preset corresponding to the fourth preset ID.

Hereinafter, assuming that the object based audio contents playback apparatus 200 consecutively replays two object based audio contents and each of the object based audio contents include an audio preset 1, an audio preset 2, and audio preset 3, an operation of the object based audio contents playback apparatus 200 will be described in detail. Also, in this instance, it is assumed that a preset ID of the audio preset 3 of a first object based audio contents is set as "solo", a preset ID of the audio preset 3 of a second object based audio contents is set as "a cappella".

When the user selects the "solo" through the interface unit 220, the object based audio contents playback apparatus 200 replays the object based audio contents based on the audio preset 3 since the first object based audio contents include a preset ID identical to the "solo", whereas the object based audio contents playback apparatus 200 may not replay the second object based audio contents based on the audio preset 3 since the second object based audio contents may not include the preset ID identical to the "solo", although the second object based audio contents include an audio preset 3 corresponding to the "solo". In this instance, the object based audio contents playback apparatus 200 may not replay the second object based audio contents based on the audio preset 3 unless the user selects the "a cappella".

However, as described above, when the object based audio contents are generated in the object based audio contents generation apparatus 100 of FIG. 1, an identical preset ID is set for an identical audio preset that is commonly used. Accordingly, the plurality object based audio contents may be consecutively replayed based on the identical audio preset.

As an example, in the described case, since all preset IDs for the audio preset 3 are set to the "solo", the object based audio contents playback apparatus 200 may consecutively replay the two object based audio contents based on the audio preset 3.

According to an embodiment of the present invention of the present invention, the plurality of audio presets may include a single default audio preset, and the preset selecting unit 230 may select the default audio preset when the third preset ID corresponding to the received single fourth preset ID does not exist in the decoded plurality of third preset IDs.

That is, when the object based audio contents only include the above described audio preset 1 and the audio preset 2 and a preset ID received from the interface unit 220 is the preset ID with respect to an audio preset 3, the preset selecting unit 230 may select the audio preset 1 that is a default audio preset, and the playback unit 240 may replay the object based audio contents based on the audio preset 1. In this instance, the audio preset 1 is assumed to be the default audio preset.

Accordingly, a seamless playback of the plurality of object based audio contents may be consecutively performed.

Figure 3:
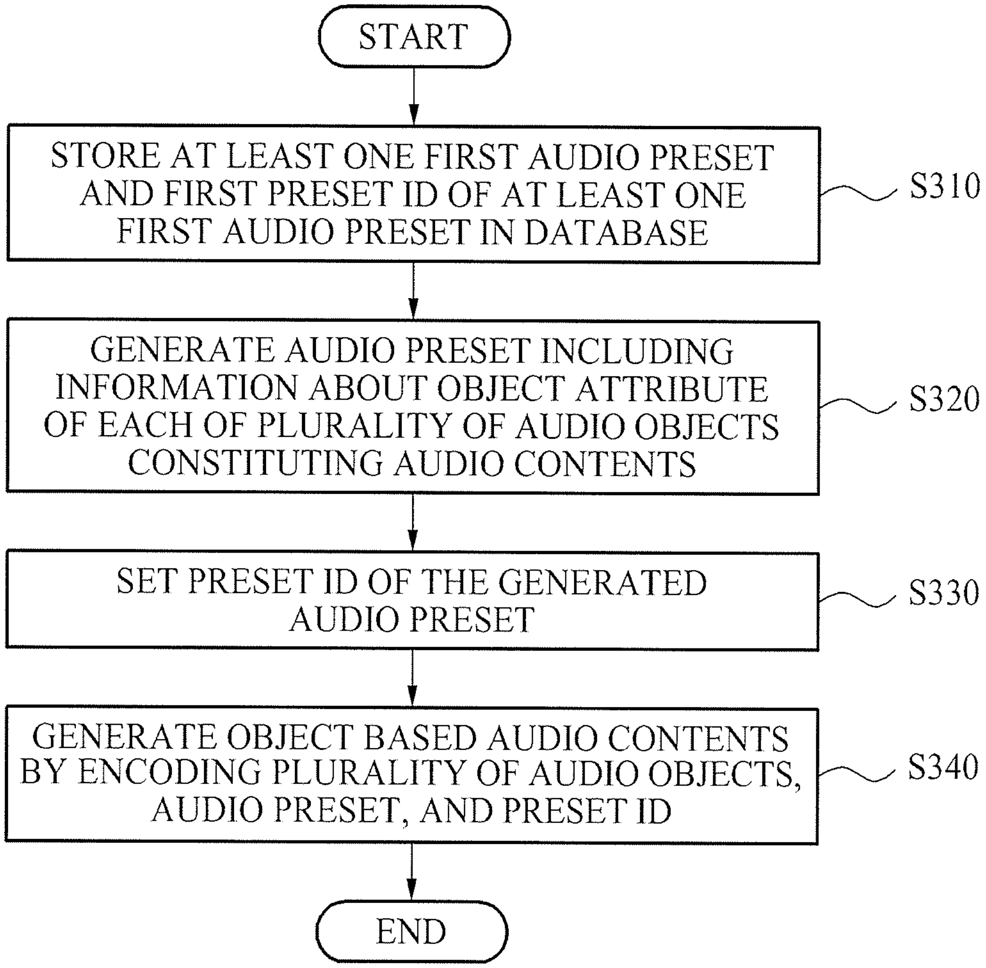
FIG. 3 is a flowchart illustrating an object based audio contents generation method according to an embodiment of the present invention.

FIG. 3 is a flowchart illustrating an object based audio contents generation method according to an embodiment of the present invention.

Referring to FIG. 3, the object based audio contents generation method according to an embodiment of the present invention may be processed in the object based audio contents generation apparatus illustrated in FIG. 1. Accordingly, although a description is omitted here, the description as to the object based audio contents generation apparatus illustrated in FIG. 1 is applicable to the object based audio contents generation method.

In operation S310, at least one first audio preset and a first preset ID of the at least one first audio preset are stored in a database.

According to an embodiment of the present invention, the at least one audio preset and the first preset ID of the first audio preset may be selected and stored based on a preference of a user of object based audio contents in operation S310.

Also, according to an embodiment of the present invention, the first preset ID may include at least one of a string and a number.

In operation S320, an audio preset including information about an object attribute of each of a plurality of audio objects constituting the audio contents.

According to an embodiment of the present invention, the object attribute may include at least one of a volume of an audio object, a location, and a sound characteristic at the location.

In operation S330, a preset ID of the generated audio preset is set.

In this instance, whether a first audio preset corresponding to the audio preset generated in operation S320 exists in the database in operation S330 is determined.

When the first audio preset corresponding to the generated audio preset exists in the database, a first preset ID of the corresponding first audio preset may be set as the preset ID of the generated audio preset in operation S330.

When the first audio preset corresponding to the generated audio preset does not exist in the database, a second preset ID different from at least one first preset ID stored in the database is generated and the generated second preset ID may be set as the preset ID of the generated audio preset in operation S330.

In operation S340, the object based audio contents are generated by encoding the plurality of audio objects, the audio preset and the preset ID.

Figure 4:
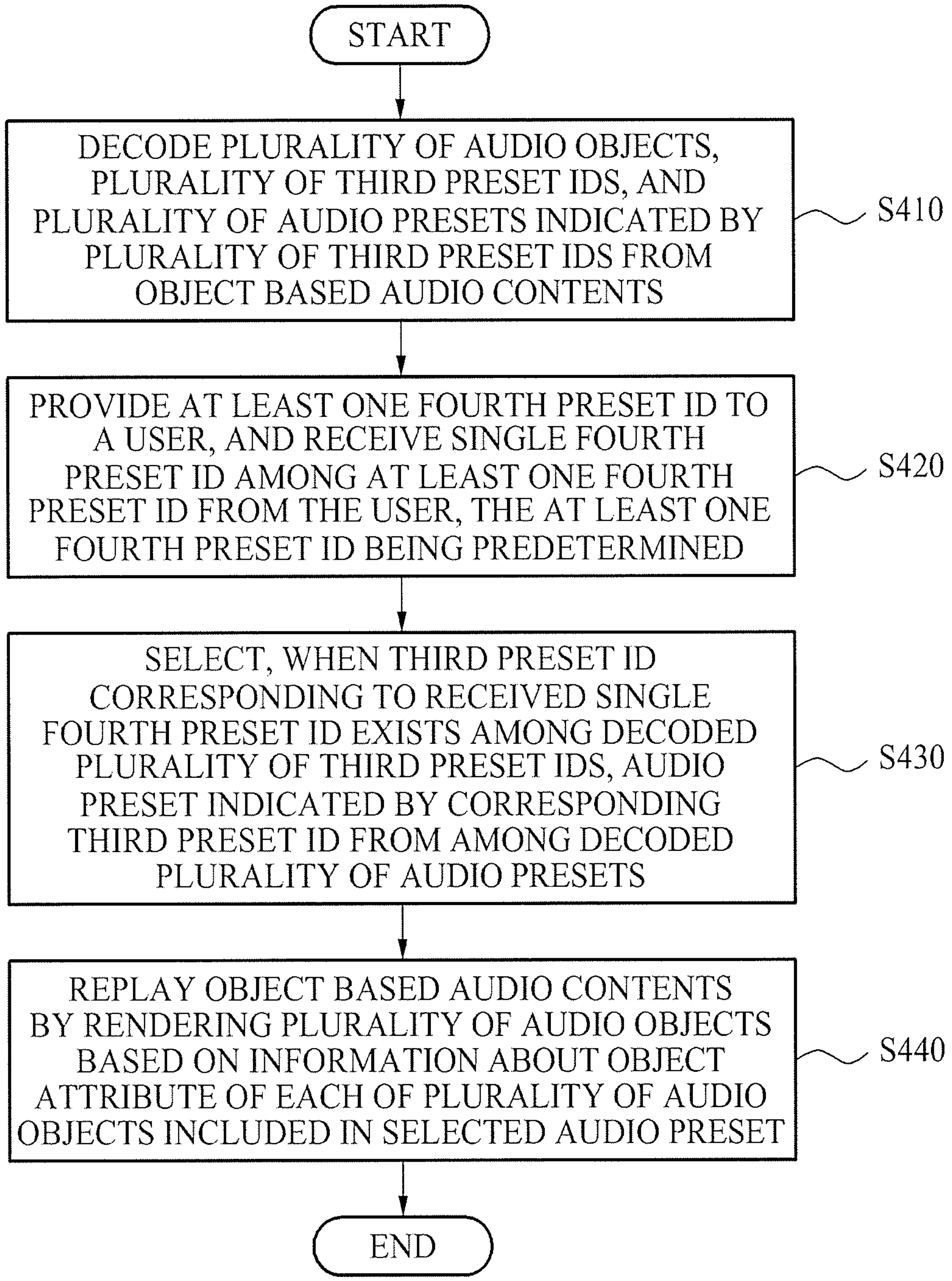
FIG. 4 is a flowchart illustrating an object based audio contents playback method according to an embodiment of the present invention.

FIG. 4 is a flowchart illustrating an object based audio contents playback method according to an embodiment of the present invention.

Referring to FIG. 4, the object based audio contents playback method according to an embodiment of the present invention may be processed in the object based audio contents playback apparatus illustrated in FIG. 2. Accordingly, although a description is omitted here, the description as to the object based audio content playback apparatus may be applicable to an object based audio contents playback method according to an embodiment of the present invention.

In operation S410, a plurality of audio objects, a plurality of third preset IDs, and a plurality of audio presets indicated by the plurality of third preset IDs are decoded from object based audio contents.

In this instance, a corresponding audio preset may include information about an object attribute of each of the plurality of the audio object. Also, the object attribute may include at least one of a volume of the audio object, a location, and a sound characteristic at the location.

In operation S420, at least one fourth preset ID is provided to a user, and a single fourth preset ID among the at least one fourth preset ID is received from the user, the at least one fourth preset ID being predetermined.

According to an embodiment of the present invention, the third preset ID and the fourth preset ID may include at least one of a string and a number.

In operation S430, when a third preset ID corresponding to the received single fourth preset ID exists among decoded plurality of third preset IDs, an audio preset indicated by the corresponding third preset ID is selected from among decoded plurality of audio presets.

According to an embodiment of the present invention, the plurality of audio presets may include a single default audio preset, and when the third preset ID corresponding to the received single fourth ID does not exist among the decoded plurality of third preset IDs, the default audio preset may be selected.

In operation S440, an object based audio contents may be replayed by rendering a plurality of audio objects based on the information about the object attribute of the plurality of audio objects included in the selected audio preset.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for playback of object based audio contents, comprising:

a decoding unit to decode, from the object based audio contents, a plurality of audio objects, a plurality of third preset IDs, and a plurality of audio presets indicated by the plurality of third preset IDs, the audio preset including information about an object attribute of each of the plurality of audio objects;

an interface unit to provide at least one fourth preset ID to a user, and to receive a single fourth preset ID among the at least one fourth preset ID from the user, the at least one fourth preset ID being predetermined;

a preset selecting unit to select an audio preset indicated by a third preset ID corresponding to the received single fourth preset ID from among the decoded plurality of audio presets, when the third preset ID corresponding to the received single fourth preset ID exists among the decoded plurality of third preset IDs, and to select the audio preset indicated by the third preset ID as the audio preset for the single fourth preset ID; and a playback unit to perform playback of the object based audio contents by rendering the plurality of audio objects based on the information about the object attribute of each of the plurality of audio objects included in the selected audio preset, wherein the object attribute includes a location of the audio object.

2. The apparatus of claim 1, wherein: the plurality of audio presets include a single default audio preset; and the preset selecting unit selects the default audio preset when the third preset ID corresponding to the received single fourth preset ID does not exist among the decoded plurality of third preset IDs.

3. The apparatus of claim 1, wherein the third preset ID and the fourth preset ID include at least one of a string and a number.

4. The apparatus of claim 1, wherein the object attribute includes a volume of the audio object and a sound characteristic at a location.

5. A method for playback of object based audio contents, comprising:

decoding, from the object based audio contents, a plurality of audio objects, a plurality of third preset IDs, and a plurality of audio presets indicated by the plurality of third preset IDs, the audio preset including information about an object attribute of each of the plurality of audio objects;

providing at least one fourth preset ID to a user and receiving a single fourth preset ID among the at least one fourth preset ID from the user, the at least one fourth preset ID being predetermined;

selecting an audio preset indicated by a third preset ID corresponding to the received single fourth preset ID from among the decoded plurality of audio presets, when the third preset ID corresponding to the received single fourth preset ID exists among the decoded plurality of third preset IDs, wherein the audio preset indicated by the third preset ID is the audio preset for the single fourth preset ID; and performing playback of the object based audio contents by rendering the plurality of audio objects based on the information about the object attribute of each of the plurality of audio objects included in the selected audio preset, wherein the object attribute includes a location of the audio object.

6. The method of claim 5, wherein: the plurality of audio presets include a single default audio preset; and the selecting of the audio preset selects the default audio preset when the third preset ID corresponding to the received single fourth preset ID does not exist among the decoded plurality of third preset IDs.

7. The method of claim 5, wherein the third preset ID and the fourth preset ID include at least one of a string and a number.

8. The method of claim 5, wherein the object attribute includes a location of the audio object.

* * * * *